Patented June 27, 1939

2,163,907

UNITED STATES PATENT OFFICE 2,163,907

HUMIDITY CONTROL

Anson W. De Vout, La Grange, Ill., assignor to Industrial Patents Corporation, Chicago, Ill., a corporation of Delaware No Drawing. Application May 13, 1936, Serial No. 79,593

2 Claims. (Cl. 99—161)

This invention relates to methods for controlling and determining the humidity of storage rooms.

One of the objects of the invention is to provide a method for controlling the humidity of storage rooms.

Another object of the invention is to provide a method for determining the effective humidity of storage rooms.

Other objects will be apparent from the description and claims which follow.

In my copending application entitled Food storage, Serial No. 79,592, filed May 13, 1936, I have described a method and apparatus for humidifying refrigerated chambers including egg storage rooms.

The present invention is concerned with the determination of the effective humidity of such storage rooms.

It is well known that eggs packed in conventional egg cases with fillers and flats and stored in a conventional refrigerated chamber at from 28 to 32 degrees F. tend to give up their moisture with a resultant loss in weight and quality. It has been proposed from time to time to employ various means for raising the humidity of egg storage chambers to counteract the tendency of the eggs to shrink. However, I have found that a humidity reading of the atmosphere of an egg storage room is not a safe guide for the rate of shrink of the eggs. It is true that if other conditions are controlled, the humidity of the atmosphere may be a measure of optimum conditions but it is also true that the same relatively ideal humidity of the atmosphere may be maintained and yet due to failure to control other conditions heavy shrink losses will be suffered.

I have discovered that the shrink of eggs may not be satisfactorily reduced by the mere control of the humidity of the chamber air. Methods which rely solely upon humidity control may have some beneficial effect, but the effect is of relatively small degree. Such methods have ignored the presence of the humidity screen, formed by the egg cases, fillers and flats.

The present invention provides a method whereby the rate of satisfaction of the water absorption needs of the cases, fillers and flats, in an egg storage room may be accurately determined.

In carrying out the present invention hygroscopic material of an equivalent nature to that normally present in the room is weighed and placed in the refrigerated chamber and thereafter weighed from time to time. The weight increases as moisture is absorbed. When the weight ceases to increase by reason of water absorption, the water absorption needs of the hygroscopic material present in the chamber have been satisfied.

In practice, in carrying out the invention in an egg storage room, five empty egg cases supplied with the usual fillers and flats are weighed and placed in the room. The room is then sprayed with moisture in accordance with the teachings of my copending application, Serial No. 79,592. The empty cases are weighed each week. The rate at which the empty egg cases gain weight through the absorption of moisture bears a distinct relationship to the egg carrying ability of the room. If insufficient moisture is being added, the cases will lose weight, indicating the need of additional spraying. By employing the present method of conditioning the room, humidity readings may be almost ignored, and eggs may be carried with safety in rooms which might otherwise be considered hazardous.

In extremely large rooms it is well to supply several sets of empty egg cases as measuring devices, installed through various parts of the room to give a more accurate check on conditions throughout the room.

It will be understood that the present invention has been described with particular reference to the storage of eggs by way of illustration and not by way of limitation.

It will be understood that the method of the present invention may be employed in determining the effective humidity in all storage rooms wherein products are subject to shrink and in which the moisture content of the air is significant.

It will be further understood that any suitable hygroscopic substance may be used as a measuring device, but that it is preferred to employ hygroscopic control material which is identical to that normally present in the room.

I claim:

1. The method of controlling effective humidity of a refrigerated chamber which comprises introducing moisture into the atmosphere periodically, ascertaining the moisture absorption rate of hygroscopic material in the chamber by periodic measurement of the moisture content of hygroscopic control material maintained in the chamber, and continuing the introduction of moisture into the atmosphere of the chamber at a sufficient rate to keep completely satisfied the moisture absorption demands of the hygroscopic control material.

2. The method of controlling the effective humidity of an egg storage room which comprises ascertaining the rate of water absorption of an empty egg case containing fillers and flats by periodic weighing of the case maintained in the storage room, and introducing moisture into the atmosphere at a sufficient rate to completely satisfy the moisture absorption demands of the empty case, and thereafter maintaining the egg case at a constant maximum weight.

ANSON W. DE VOUT.